Patented Jan. 1, 1946

2,392,107

UNITED STATES PATENT OFFICE 2,392,107

CATALYSTS

John W. Teter, Chicago, Ill., assignor to Sinclair Refining Company, New York, N. Y., a corporation of Maine No Drawing. Application November 13, 1940, Serial No. 365,563

6 Claims. (Cl. 252—207)

This invention relates to the direct catalytic amination of an olefine with ammonia. The invention includes catalysts capable of selectively promoting direct amination of an olefine in the presence of ammonia as well as a method of producing such catalysts.

The reaction of direct amination of an olefine with ammonia is one in which one N–H bond of ammonia is activated and in which the double bond of an olefine is in the active state. The reaction proceeds when the reactants, thus activated, are in intimate contact. Activation of these bonds occurs at temperatures from about 450° F. to about 750° F. under pressures of about 500 pounds per square inch and upward when the reactants are in intimate contact in the presence of a catalyst selectively promoting the amination reaction. Amines and nitriles, and in some instances acid amides, are formed in the course of the amination reaction. The amines are subject to cracking under the reaction conditions and are substantially dehydrogenated when some catalysts are used. The hydrogen liberated as a result of the amine dehydrogenation combines with the olefine to form the corresponding paraffin and thus depletes the amount of olefine available for the amination reaction. Polymerization of the olefine under the reaction conditions further serves to consume the olefine which would otherwise be available for amination. Accordingly, a catalyst satisfactory for the direct amination of an olefine with ammonia must selectively promote the amination reaction in order to permit control over the competing reactions of cracking, polymerization, dehydrogenation and hydrogenation.

I have found that the direct amination of an olefine in the presence of ammonia may be selectively promoted with a catalyst comprising metallic cobalt deposited on a siliceous carrier. Siliceous carriers such as silica or a silicate may be used with advantage. I have found that siliceous carriers such as silica gel, diatomaceous silica, diatomaceous earth, and cobalt silicate are particularly effective. The effectiveness of these siliceous supports for the catalytic cobalt is a sharp contrast to other synthetic oxides which generally are either unsatisfactory or give erratic results as carriers for the metallic cobalt.

I have found that such catalysts selectively promoting direct amination of an olefine in the presence of ammonia can be produced by precipitating on a siliceous carrier a cobalt compound capable upon calcination of forming cobalt oxides, by calcining the cobalt compound precipitated on the carrier, and by then reducing the calcined cobalt compound in a hydrogen atmosphere at an elevated temperature. Cobalt hydroxide and cobalt carbonates, such, for example, as cobalt basic carbonate, are examples of cobalt compounds capable upon calcination of forming cobalt oxide. Calcination of the cobalt compound precipitated on a siliceous carrier may be effected with advantage at a temperature of about 660° F. It is advantageous to maintain an inert atmosphere, such as a nitrogen atmosphere, about the cobalt compound during calcination. Reduction of the calcined cobalt compound in a hydrogen atmosphere may be effected with advantage by temperatures upwards of about 600° F. A reduction temperature of about 660° F. may be used with particular advantage. Reduction of the calcined cobalt compound at a temperature of about 660° F. may be effected to a substantial extent in a period of about 24 hours although extended reduction periods of as much as 100 hours or more may be used with advantage. Reduction of the calcined cobalt compound should be substantially complete for optimum results inasmuch as the presence of metal oxides and salts other than the siliceous carriers referred to hereinabove have a generally disadvantageous effect upon the amination reaction by promoting the competing reactions of cracking, polymerization, dehydrogenation and hydrogenation. Moreover, metallic cobalt catalysts obtained by soaking a siliceous carrier in a cobalt salt solution, such as a solution of cobalt nitrate, followed by calcination and subsequent reduction of the cobalt oxide deposited on the siliceous carrier are much less active in the direct amination reaction than metallic cobalt catalysts obtained by precipitating on a siliceous carrier a cobalt compound capable upon calcination of forming cobalt oxide.

The following specific examples will illustrate the preparation of metallic cobalt catalysts of my invention:

Example I

A catalyst comprising metallic cobalt on silica gel was obtained by diluting 1452 g. of a commercial sodium silicate solution containing about 8.89% (by weight) sodium oxide and about 27.6% (by weight) silica with 5 gallons of distilled water. This solution was agitated with mechanical stirring while dilute hydrochloric acid was added to render the solution neutral to litmus paper. After further agitation for about twenty minutes an additional quantity of hydrochloric acid was added to make the suspension acid to Congo red and stirring was continued for an additional hour. Ammonium hydroxide was then added to the suspension to render it neutral to litmus paper, stirring was continued for another twenty minutes, and the silica gel was filtered and washed with distilled water. The wet silica gel was suspended in 30 liters of distilled water in which 4212 g. of cobalt acetate tetrahydrate had been dissolved. Then, 15 g. of sodium hydroxide dissolved in 6 liters of distilled water was added slowly with good mechanical agitation of the suspended silica gel. After addition of the sodium hydroxide agitation was continued for thirty minutes and the resulting mass was filtered. The filter cake was thoroughly washed with distilled water until no sodium or chloride ions could be detected in the wash water. The washed filter cake was dried in a steam oven and was screened. The screened dry filter cake, which assayed 50.5% cobalt, was then reduced in a stream of hydrogen for a period of twenty-four hours while maintained at a temperature of about 660° F.

Example II

A catalyst comprising metallic cobalt on cobalt silicate was prepared by dissolving 3180 g. of cobalt acetate tetrahydrate in 12 liters of distilled water and by filtering this mass to obtain a clear solution. The clear solution was mechanically agitated while 800 g. of sodium carbonate monohydrate was added. Then, 1560 g. of the same commercial sodium silicate solution diluted with 3 liters of distilled water was added with agitation to the other solution and agitation was continued for an additional thirty minutes with the resulting formation of a uniform suspension of precipitated cobalt silicate. A filtered solution of 2040 g. of cobalt acetate tetrahydrate dissolved in 10 liters of distilled water was added to the cobalt silicate suspension and the resulting mass was stirred for thirty minutes. Then, 1530 g. of sodium carbonate dissolved in 5 liters of distilled water were added slowly with continued agitation followed by the addition of 350 g. of sodium hydroxide. After forty-five minutes of further agitation the precipitate was filtered and the filter cake was washed by slurrying with distilled water until the filtrate tested neutral with phenolphthalein. The density of the resulting washed filter cake after drying was 0.74 and the filter cake contained 46.4% cobalt by chemical analysis. The dried powder was then reduced in a stream of hydrogen for about twenty-four hours at a temperature of 660° F.

Example III

A catalyst comprising metallic cobalt deposited on diatomaceous silica was obtained by stirring a mixture of 2233 g. of cobalt acetate tetrahydrate, 500 g. of a diatomaceous silica marketed by the Johns-Manville Company under the trade name "Snow Floss," and 10 liters of distilled water for about an hour. A solution of 765 g. of sodium carbonate monohydrate dissolved in 2.5 liters of distilled water was added to this mixture in a fine stream while continuing agitation. Then, 2 liters of distilled water were added, followed, after fifteen minutes of stirring, by a second addition of 765 g. of sodium carbonate monohydrate dissolved in 2.5 liters of water. After this second addition of the sodium carbonate the mass was stirred for several hours and allowed to stand over night before filtering and washing. The filter solids were dried first at 250° F. and subsequently at 500° F. The dried product contained 42.1% by weight of cobalt and was then reduced in a stream of hydrogen for forty-eight hours at a temperature of about 700° F.

Each of the catalysts obtained as described in the foregoing specific examples selectively promoted direct amination of an olefine with ammonia, the same olefine (dodecene-1) being used in each instance. The catalysts of my invention selectively promote the direct amination of ole- fines obtained from widely different sources. Thus, olefines obtained by dehydrogenation of substantially pure aliphatic organic compounds, such, for example, as paraffinic hydrocarbons or dehydration of aliphatic alcohols, or olefines available in gas mixtures produced in the processing of hydrocarbon oils, as in the refining of petroleum, may be directly aminated with ammonia with the catalysts of my invention. Amines and nitriles are directly produced by the catalytic amination of such olefines in the presence of ammonia with these catalysts. The catalysts are also effective in the amination of such olefines in the presence of ammonia and water, in which case not only amines and nitriles are formed but acid amides are also obtained to a substantial extent. In each instance the metallic cobalt-on-siliceous carrier catalysts of the invention selectively promoting amination of the olefine with effective control over the competing reactions which take place simultaneously, and to varying extents, with the amination reaction.

I claim:

1. A catalyst selectively promoting direct amination of an olefine in the presence of ammonia which comprises metallic cobalt deposited on a cobalt silicate carrier.

2. The method of producing a catalyst selectively promoting direct amination of an olefine in the presence of ammonia which comprises precipitating on a cobalt silicate carrier a cobalt compound capable upon calcination of forming cobalt oxide, calcining the cobalt compound precipitated on the carrier, and reducing the calcined cobalt compound in a hydrogen atmosphere at a temperature of about 660° F.

3. The method of producing a catalyst selectively promoting direct amination of an olefine in the presence of ammonia which comprises precipitating cobalt hydroxide on a cobalt silicate carrier, calcining the cobalt hydroxide precipitated on the carrier with the resulting production of cobalt oxide, and reducing the cobalt oxide in a hydrogen atmosphere at an elevated temperature.

4. The method of producing a catalyst selectively promoting direct amination of an olefine in the presence of ammonia which comprises precipitating cobalt basic carbonate on a cobalt silicate carrier, calcining the cobalt basic carbonate with the resulting production of cobalt oxide, and reducing the cobalt oxide in a hydrogen atmosphere at an elevated temperature.

5. The method of producing a catalyst selectively promoting direct amination of an olefine in the presence of ammonia which comprises precipitating on a cobalt silicate carrier a cobalt compound capable upon calcination of forming cobalt oxide, calcining the cobalt compound precipitated on the carrier, and reducing the calcined cobalt compound in a hydrogen atmosphere at an elevated temperature.

6. The method of producing a catalyst selectively promoting direct amination of an olefine in the presence of ammonia which comprises admixing a silicate solution with a solution of a cobalt salt with the resulting production of a cobalt silicate suspension, precipitating on the cobalt silicate in suspension a cobalt compound capable upon calcination of forming cobalt oxide, calcining the cobalt compound precipitated on the carrier, and reducing the calcined cobalt compound in a hydrogen atmosphere at an elevated temperature.

JOHN W. TETER.